United States Patent [19]

Bourque

[11] Patent Number: 5,667,114
[45] Date of Patent: Sep. 16, 1997

[54] CARRYING APPARATUS FOR A PORTABLE COMPUTER

[76] Inventor: Richard A. Bourque, 15054 Downing Oak Ct., Los Gatos, Calif. 95032

[21] Appl. No.: 495,768

[22] Filed: Jun. 27, 1995

[51] Int. Cl.⁶ ............................................. A45F 5/00
[52] U.S. Cl. ........................... 224/270; 224/257; 224/265
[58] Field of Search .................................. 224/270, 271, 224/257, 258, 265, 266; 2/49.3; 108/43

[56] References Cited

U.S. PATENT DOCUMENTS

| | | | |
|---|---|---|---|
| 1,542,163 | 6/1925 | Morde | 108/43 |
| 3,541,976 | 11/1970 | Rozas | 224/270 |
| 4,913,390 | 4/1990 | Berke | 248/176 |
| 5,100,098 | 3/1992 | Hawkins | 248/917 |
| 5,186,375 | 2/1993 | Plonk | 224/270 |
| 5,397,040 | 3/1995 | Lee | 224/901 |

*Primary Examiner*—David J. Walczak
*Attorney, Agent, or Firm*—Skjerven, Morrill, MacPherson, Franklin & Friel; Arthur J. Behiel

[57] ABSTRACT

A laptop-computer carrying apparatus that includes a platform for supporting a laptop computer. The apparatus also includes a pair of supporting members, each connected to one side of the platform. A carrying strap is connected between the supporting members, and may be looped around a computer user's neck or shoulders to support the platform at approximately waist level. The user may then use the platform as a work surface upon which the laptop computer may be securely fastened.

21 Claims, 6 Drawing Sheets

CARRYING APPARATUS FOR A PORTABLE COMPUTER

BACKGROUND

Portable "laptop" computers have been around for a number of years. These devices are easily portable, typically weighing from 2 to 10 pounds, and so give the computer user ready access to powerful computational, analytical, and memory tools in a variety of situations and environments.

Unfortunately, while laptop computers provide greater portability than larger machines, they are still awkward to use in many situations, such as where no adequate work surface is available on which to place the computer. As examples, a civil engineer may wish to inspect a bridge and simultaneously calculate various aspects of the bridge geometry, an insurance adjuster may find it desirable to enter relevant information directly into a computer at the site of a burned building, or a soldier may wish to record important strategic data in the field.

In the prior art, data from the bridge or burned building is typically written down on, for example, a clipboard, and later entered into a computer for analysis or storage. Or, in military operations, the soldier may radio information to a remote location for analysis or storage. These prior art solutions are prone to error because they require the data be transposed twice, and are further disadvantages because they do not provide the user with immediate access to the computer's analytical and storage capabilities.

Where no adequate work surface is available, the user's lap often provides a convenient work surface where there exists a place to sit (e.g., on an airplane, in a car, or at a conference). However, those who attempt to use a "laptop" computer on their lap quickly discover how awkward this can be. The computer, thus positioned, is apt to slide from side to side on the user's thighs. Moreover, the computer is likely to topple away from the user and off onto the floor: this is especially true when the screen tilted back at an angle adequate for viewing. Such an incident is likely to damage or destroy an expensive piece of equipment and otherwise frustrate the user's purpose. And, even if the computer is sufficiently stable, the awkward position of the computer can lead fatigue and pain in the user's wrists and back.

For the foregoing reasons, there exists a need for an apparatus that renders a laptop computer truly portable; an apparatus that provides a stable, ergonomic work surface for a laptop computer where none existed before.

SUMMARY

The present invention is directed to an apparatus that satisfies the need to provide a stable, ergonomic, portable work surface for a laptop computer. The apparatus includes a platform having a top surface upon which to securely mount a laptop computer. The platform is designed to provide stability when placed on a lap.

The invention also includes supporting members coupled to the platform and to a carrying strap that may be worn around a user's neck or shoulders. The strap and supporting members suspend the platform so that the platform hangs at waist level with the top surface of the platform substantially perpendicular to the user. Thus suspended, the laptop computer may be used while the user is in a standing position. In addition, the supporting members are pivotally connected to the platform so that the platform may be rotated to rest comfortably against the user when the computer is not is use.

BRIEF DESCRIPTION OF THE FIGURES

These and other features, aspects, and advantages of the present invention will become better understood with regard to the following description, appended claims, and accompanying drawings, where:

DETAILED DESCRIPTION

Figure 1A:
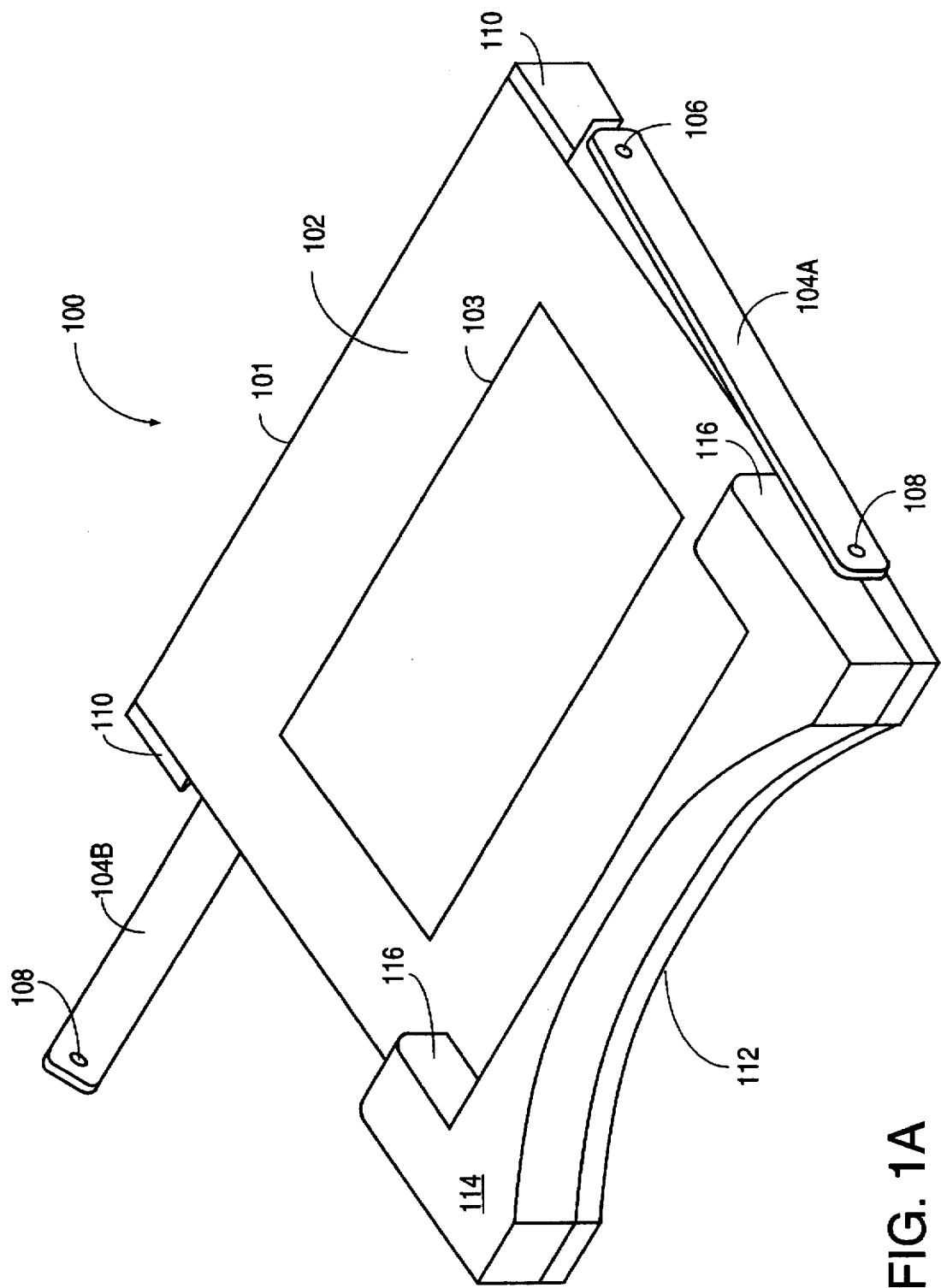
FIG. 1A shows a carrying apparatus 100 for a portable computer.

As shown in FIG. 1A, a carrying apparatus 100 for a portable computer includes a platform 101 having a top surface 102, a pair of supporting members 104A and 104B, a pair of supporting-member stops 110, and a wrist support member 114.

Platform 101 is typically injection-molded ABS plastic, although other materials may be used. In one embodiment, platform 101 is made so that top surface 102 is at an angle $\alpha$ of approximately 5° to 10° when platform 101 is placed on a horizontal work surface. The extended angle of supporting members 104A and 104B, typically 25° to 45°, is selected to afford easier keyboard access and visibility. Adjustable supports (not shown) may be provided on the bottom surface of platform 101 to allow the angle of top surface 102 to be adjusted to provide maximum user comfort when carrying apparatus 100 is set on a working surface such as a table. Platform 101 is shown in FIG. 1A to be a continuous surface, but other configurations capable of supporting a computer may be used.

Figure 1B:
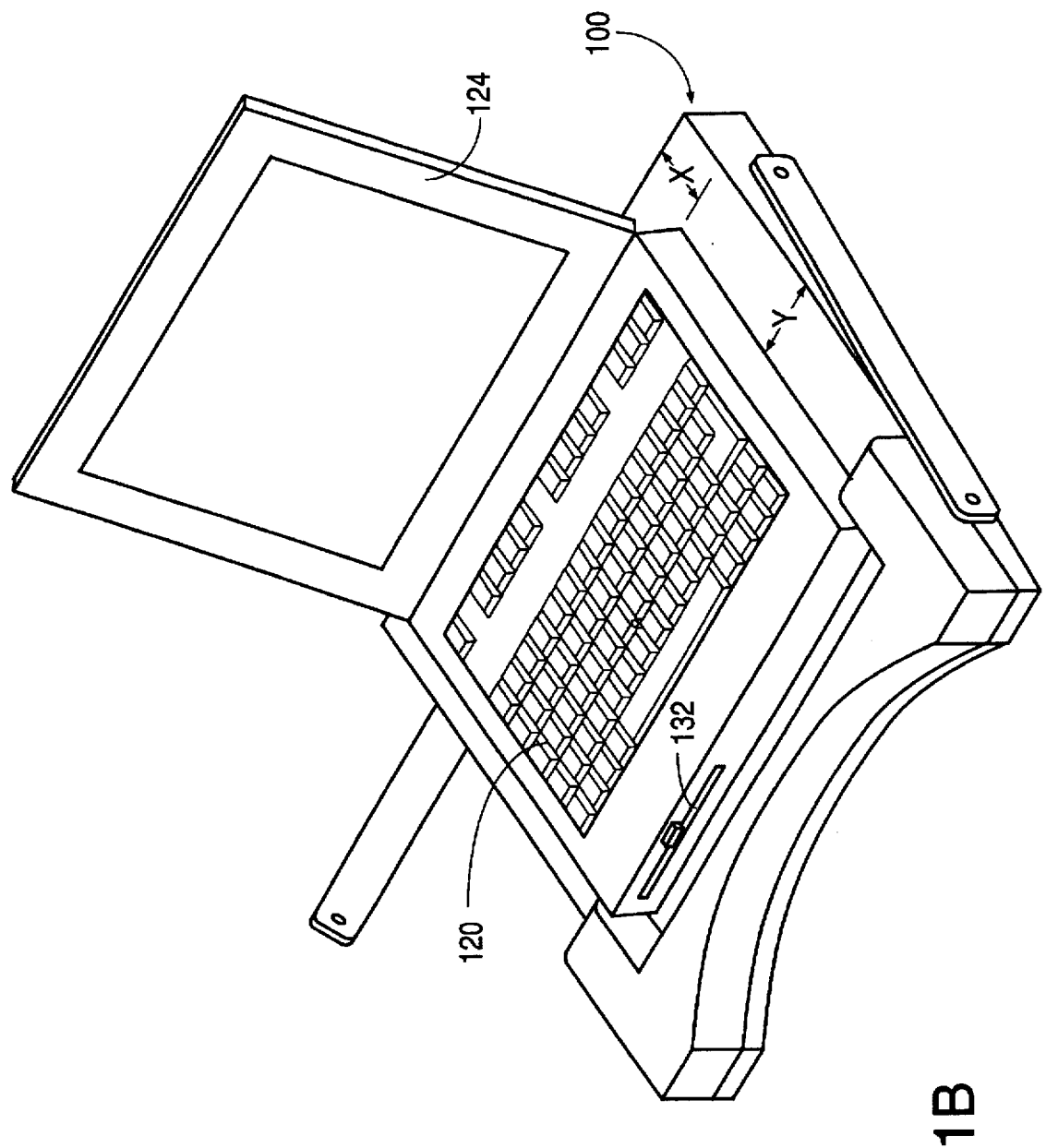
FIG. 1B shows a laptop computer 120 secured to carrying apparatus 100 of FIG. 1A.

Top surface 102 includes a computer mount 103 for securing a laptop computer to top surface 102. FIG. 1B shows such a laptop computer, laptop computer 120, secured to top surface 102 of platform 101. Mount 103 (and a corresponding mount applied to the bottom surface of laptop computer 120) are synthetic hook and loop materials that adhere when pressed together, commonly sold under the trademark "Velcro." Many other well-known types of fasteners may be used to mount laptop computer 120 to top surface 102. A preferred fastener will provide a secure bond and yet allow laptop computer 120 to be easily disconnected from platform 101.

Dimension X of FIG. 1B is selected to ensure laptop computer 120 will not topple backward off a user's lap when the display screen 124 is deployed. Dimension Y of FIG. 1B is selected to provide stability for laptop use of laptop computer 120. Dimensions X and Y are typically 2 inches and 1.5 inches, respectively. Of course, dimensions X and/or Y may be minimized for applications that require carrying apparatus 100 to be of minimal size.

In one embodiment, a non-skid bottom surface (not shown) on carrying apparatus 100 further improves stability for laptop use. For example, the bottom surface of carrying apparatus 100 may be textured, or a non-skid rubber or fabric covering may be provided over the bottom surface to both improve stability and protect valuable work surfaces from being scratched by carrying apparatus 100.

Supporting members 104A and 104B are pivotally connected to platform 101 by pivot pins 106, which may be discrete or may be formed as integral parts of either platform 101 or supporting members 104A and 104B. Supporting members 104A and 104B each include an aperture 108 that is used to connect supporting members 104A and 104B to a carrying strap (e.g. carrying strap 130 of FIG. 2). As will be readily understood by those skilled in the art, many conventional methods of securing supporting members 104A and 104B to carrying strap 130 are available, many of which do not require the use of aperture 108.

The rotation of supporting members 104A and 104B is limited by supporting member stops 110, which may be pins extending from platform 101 or may be formed integral to platform 102. In one embodiment, when supporting members 104A and 104B contact supporting-member stops 110, apertures 108 are located forward of the center of gravity of carrying apparatus 100, so that top surface 102 slopes down and away from user 150 when suspended by carrying strap 130. This configuration provides a more natural feel for user 150 when typing in the standing position. In another embodiment, supporting-member stops 110 are adjustable to allow different degrees of rotation for supporting members 104A and 104B, thereby allowing top surface 102 to be suspended at different angles relative to the user, the angle depending on user preference. Additional stops (not shown) may be provided to keep supporting members 104A and 104B from extending below platform 101 when supporting members 104A and 104B are not in use.

Wrist support member 114 is attached to top surface 102, and is intended to provide support for a user's wrists while the user is typing on the keyboard of laptop computer 120. Because a laptop computer may have, for example, a lid release or a disk-drive access slot such as slot 132 of FIG. 1B, wrist support member 114 should be attached to top surface 102 in a manner that allows access to the forward edge of computer 120. In one embodiment, wrist support member 114 is attached to top surface 102 using synthetic materials that adhere when pressed together, commonly sold under the trademark "Velcro." In another embodiment, top surface 102 is provided with a hinged portion (not shown) that connects to wrist support member 114 at positions 116, so that wrist support member 114 may pivot at positions 116. Wrist support member 114 may also open to uncover a chamber for holding small items, such as writing implements. In one embodiment, wrist support member 114 is made of an ABS plastic core covered with a layer of resilient foam.

As shown in FIGS. 1A and 1B, platform 101 and wrist support member 114 have a concave front surface 112 that conforms to the body of a user, and thereby provides for increased comfort and stability. In addition, the curvature of front surface 112 provides increased area at the edges of wrist support member 114 over the front corners of top surface 102, where it is needed to comfortably support the heels of a user's hands. In one embodiment where wrist support 114 is made of a resilient material, a portion of wrist support 114 extends to cover the front surface of platform 101 to provide a cushion between the user and the relatively rigid material of platform 101.

Figure 2:
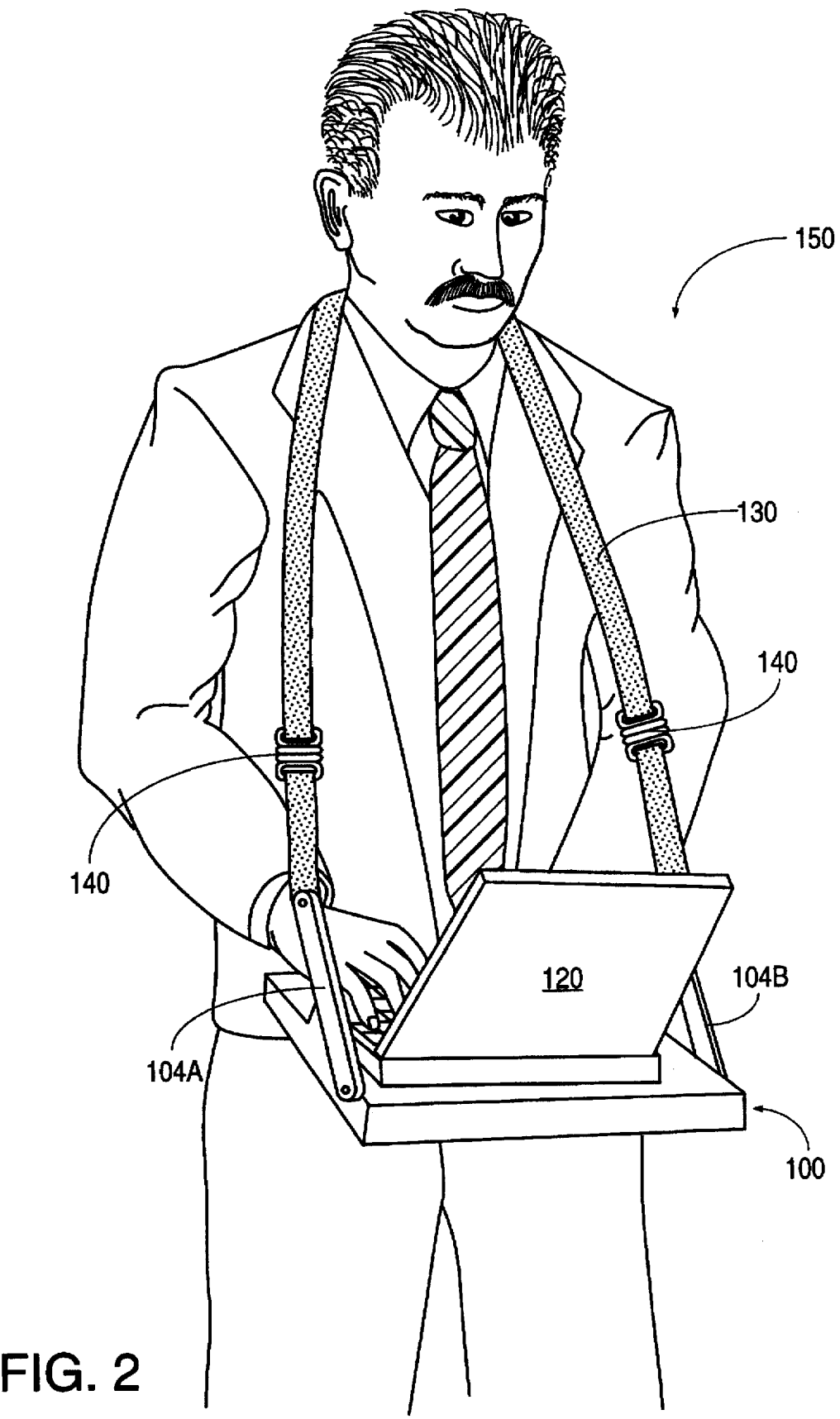
FIG. 2 shows a carrying strap 130 looped around the neck of a user 150 to support a carrying apparatus 100.

FIG. 2 shows an embodiment of carrying apparatus 100 supporting laptop computer 120 in accordance with one embodiment of the present invention. Carrying strap 130 is shown connected to supporting member 104A, looped around the neck of a user 150, and coupled to an end of supporting member 104B. In this position, gravity holds concave surface 112 of FIG. 1A against the body of user 150.

The length of carrying strap 130 may be adjusted using one or more buckles, such as buckles 140. In a preferred embodiment, one or both buckles 140 provide a quick disconnect to detach carrying strap 130 from supporting members 104A and 104B. Carrying strap 130 is typically nylon web material, but may be made from other materials, such as leather.

Because supporting members 104A and 104B are pivotally connected to platform 101, platform 101 may be tilted so that the bottom surface of platform 101 lays against the user, with concave surface 112 pointing upwards. This position allows user 150 increased freedom of movement while laptop computer 120 is not in use.

Figure 3:
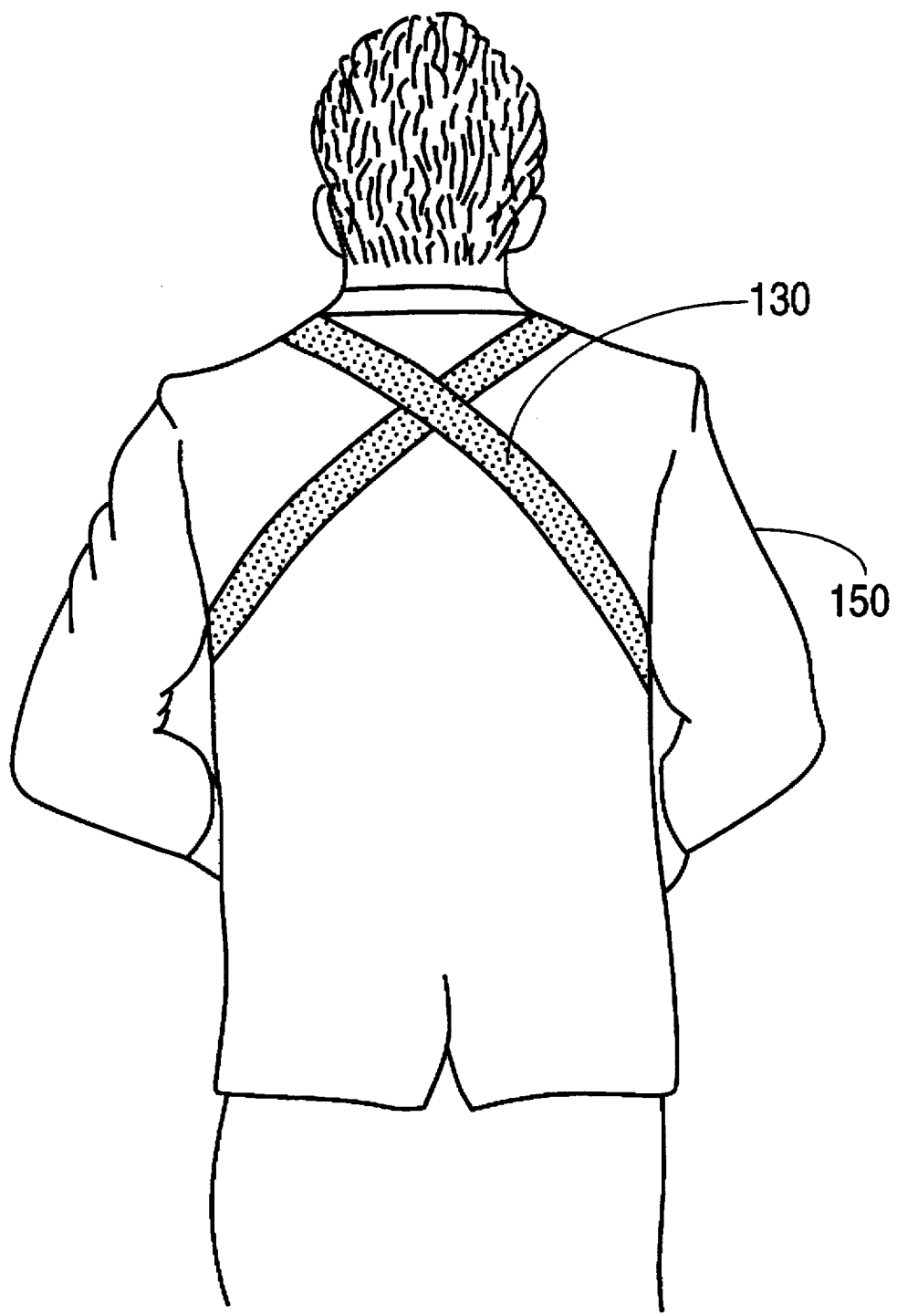
FIG. 3 shows an embodiment of the present invention that includes a carrying strap 130 that crosses behind the back of user 150.

FIG. 3 shows an embodiment of the present invention that includes a carrying strap 130 that crosses behind the back of user 150. This carrying strap configuration provides more stability for platform 101, and may be preferred for relatively heavy computers and/or when carrying apparatus 100 is to be subjected to heavy use.

Carrying strap 130 may be worn while sitting, such as in an airplane seat, to stabilize laptop computer 120, and to keep laptop computer 120 from falling on the floor. Alternately, carrying strap 130 may be stowed and platform 101 may be placed on the user's lap or some other work surface to improve the stability and ergonomic positioning of laptop computer 120.

Figure 4:
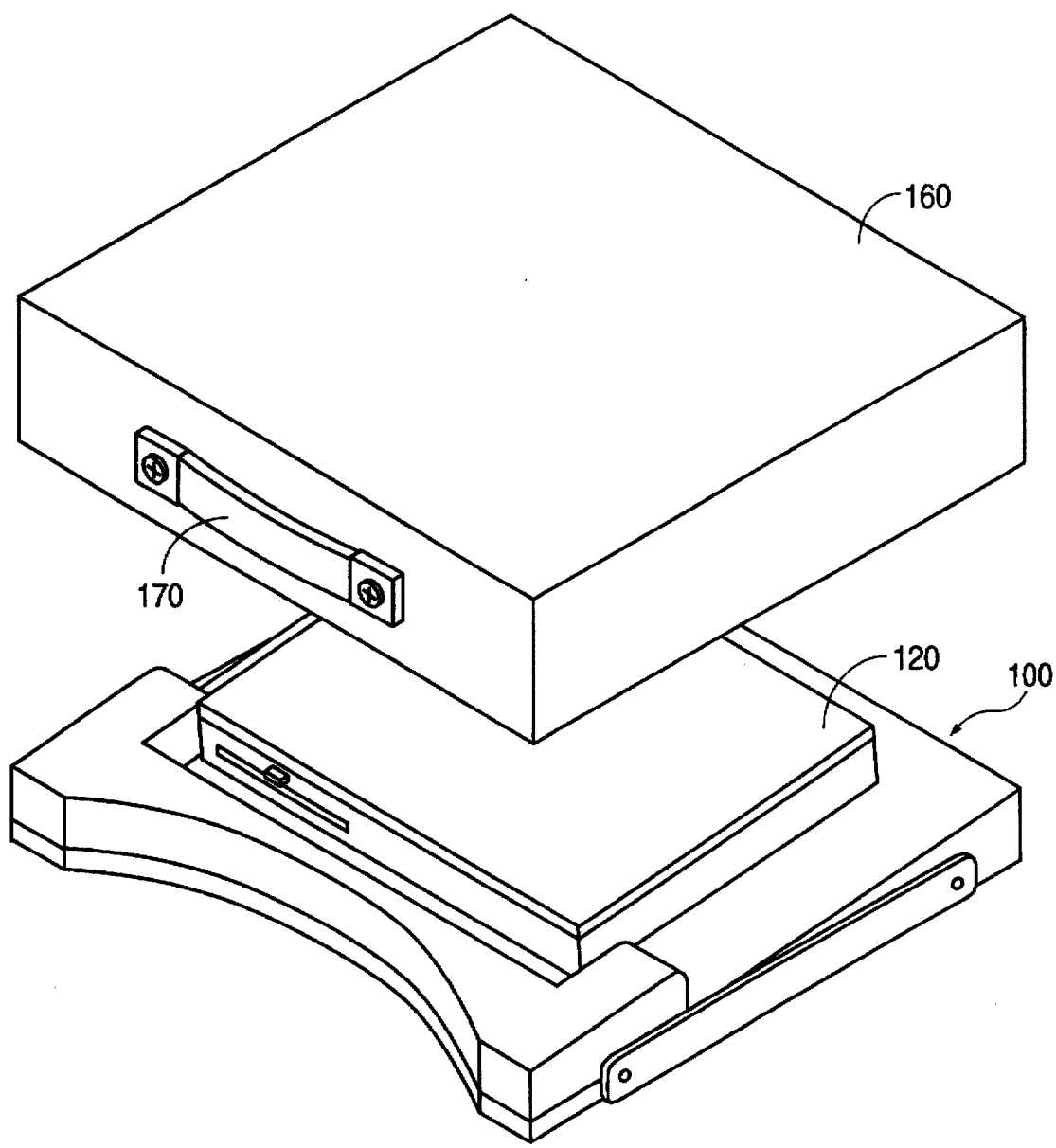
FIG. 4 shows an embodiment of the present invention in which the laptop computer 120 may be enclosed by a protective cover 160.

FIG. 4 shows an embodiment of the present invention in which the laptop computer 120 may be enclosed by a protective cover 160. Cover 160 preferably includes one or more storage compartments for storing useful items, such as pens, pencils, storage disks, and paper, and for storing carrying strap 130. Cover 160 may also include a handle 170 that may be used to carry laptop computer 120. Similarly, carrying apparatus 100 may itself be equipped with a carrying handle (not shown).

Cover 160 is not essential, as laptop computers may be closed for protection against minor impacts, dust, etc. However, cover 160 provides additional protection at a relatively low cost, and may be particularly useful in, for example, military or industrial applications where laptop computer 120 may be subjected a harsher environment than it was designed to withstand. In one embodiment, cover 160 is air and water tight to provide maximum protection from the elements.

Figure 5:
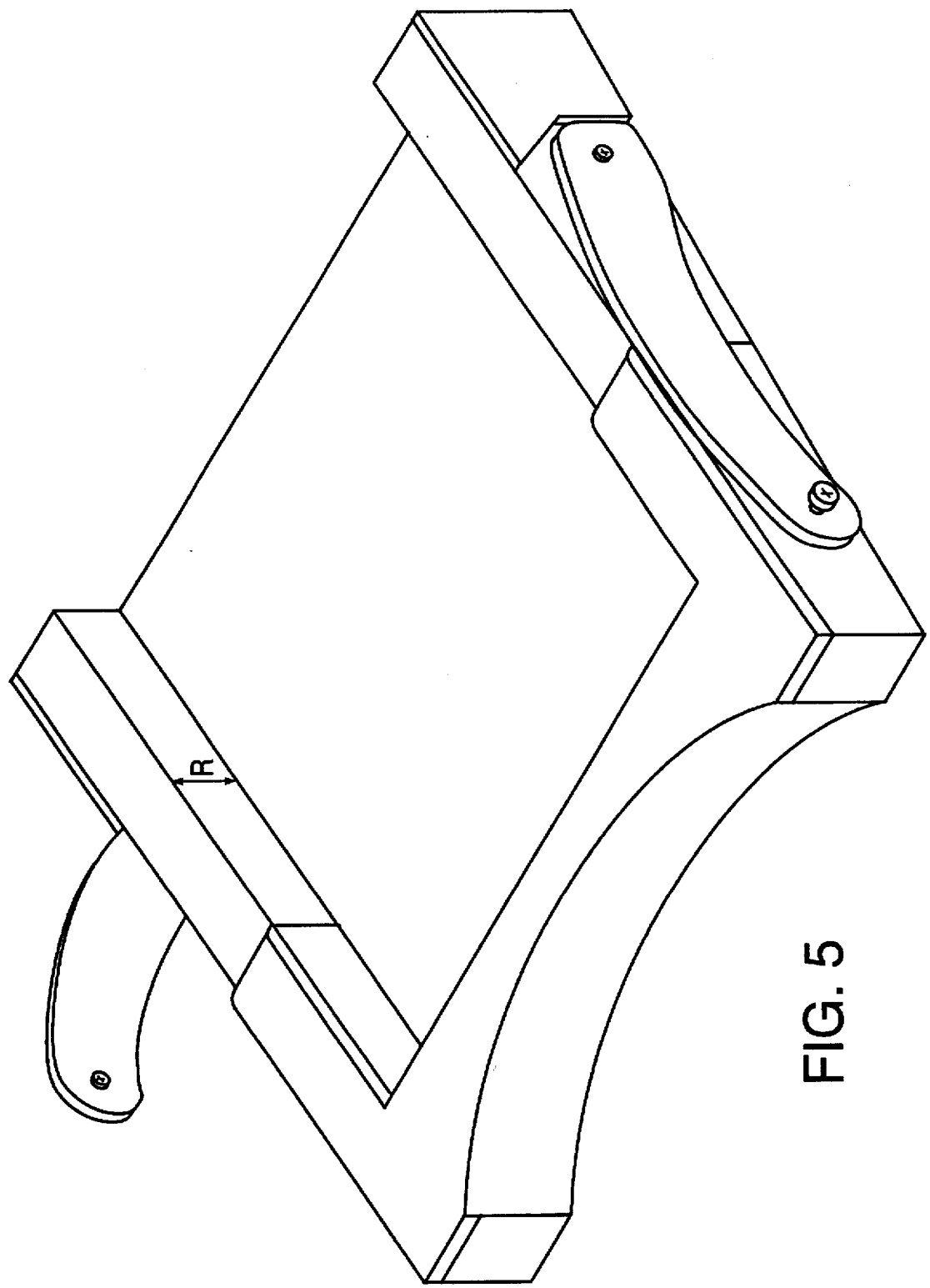
FIG. 5 shows an embodiment of the present invention in which supporting members 104A and 104B are curved to provide improved keyboard access.

FIG. 5 shows an embodiment of the present invention in which supporting members 104A and 104B are curved to provide improved keyboard access. In other embodiments, keyboard access may be further improved by locating pivot pins 106 closer to the rear edge of platform 101. However, the degree of rotation and/or the length of supporting members 104A and 104B must be adjusted to compensate for the change in position of pivot pins 106 so that platform 101 hangs at an appropriate angle when suspended.

In contrast to the embodiment of FIGS. 1A and 1B, which has open perimeters to afford easy side and rear access to computer 120, top surface 102 is recessed in the embodiment of FIG. 5 to provide additional security for laptop computer 120. Where laptop computer 120 includes side-mounted floppy disk-drive slots, the recess depth R should be selected to allow easy access.

Although the present invention has been described in considerable detail with reference to certain versions thereof, other versions are possible. For example, while the present invention is described in connection with a laptop computer, other portable computers will benefit from the advantages provided by the present invention. Therefore, the spirit and scope of the appended claims should not be limited to the description of the versions contained herein.

I claim:

1. A carrying apparatus for a portable computer, the apparatus comprising:
   a platform having first and second sides, a concave front edge, and a top surface for supporting the computer;
   first and second rigid supporting members each having first and second ends, the first ends of the supporting members being pivotally connected to the platform, wherein the first end of the first supporting member is connected to the first side of the platform and the first end of the second supporting member is connected to the second side of the platform;
   a carrying strap connected between the second ends of the supporting members;
   a computer mount connected to the platform, the computer mount for securing the computer to the platform;
   a wrist support member connected above and parallel to the front edge of the platform; and
   a cover removably connected to the platform, the cover for enclosing the computer when the computer is mounted on the platform.

2. A carrying apparatus for a portable computer, the apparatus comprising:
   a platform having a top surface, first and second side edges, a front edge, and a back edge, the top surface for supporting the computer;
   first and second rigid supporting members each having first and second ends, the first ends of the supporting members being pivotally connected to the platform at a pivot point defining a pivotal axis substantially parallel to the top surface; and
   a supporting member stop, wherein the stop precludes one of the supporting members from rotating when the one of the supporting members is extended at an angle of less than 90° with respect to a second axis substantially parallel to the top surface and perpendicular to the pivotal axis.

3. The apparatus of claim 2, further comprising a quick-disconnect coupling connected between the second end of one of the supporting members and the carrying strap.

4. The apparatus of claim 2, wherein the carrying strap is adjustable in length.

5. The apparatus of claim 2, further comprising a carrying handle.

6. The apparatus of claim 2, further comprising a cover for enclosing the computer when the computer is mounted on the platform.

7. The apparatus of claim 6, the cover further comprising a carrying handle.

8. The apparatus of claim 2, wherein the front edge has a first height and the back edge has a second height greater than the first height.

9. The apparatus of claim 2, further comprising a carrying strap connected between the second ends of the supporting members.

10. The apparatus of claim 2, further comprising a computer mount connected to the platform, the computer mount for securing the computer to the platform.

11. The apparatus of claim 10, wherein the computer mount includes synthetic hook and loop materials that adhere when pressed together.

12. The apparatus of claim 2, further comprising a wrist support member connected to the platform, the wrist support member configured to provide wrist support for a user of the computer.

13. The apparatus of claim 12, wherein the wrist support member is removably connected to the platform.

14. The apparatus of claim 12, wherein the wrist support member comprises foam rubber.

15. The apparatus of claim 2, wherein the front edge of the platform is concave.

16. The apparatus of claim 1, wherein the first end of the first supporting member is pivotally connected to the first side of the platform and the first end of the second supporting member is pivotally connected to the second side of the platform.

17. The apparatus of claim 1, further comprising a supporting member stop, wherein the stop precludes one of the supporting members from rotating freely.

18. A carrying apparatus for a portable computer, the apparatus comprising:
   a platform having a top surface, the top surface having first and second side edges, a front edge, and a back edge, the top surface for supporting the computer;
   first and second supporting members each having first and second ends, the first ends of the supporting members being pivotally connected to the platform at a pivot point defining a pivotal axis substantially perpendicular to the first and second side edges;
   a supporting member stop, wherein the stop precludes one of the supporting members from rotating freely, wherein the stop precludes the one of the supporting members from rotating when the one of the supporting members is extended at an angle of approximately 25° to 45° with respect to the first edge of the top surface; and
   a carrying strap connected between the second ends of the supporting members.

19. The apparatus of claim 17, wherein the stop precludes the one of the supporting members from rotating when the one of the supporting members is extended at an angle of less than 90° with respect to the first edge of the top surface.

20. A carrying apparatus for a portable computer, the apparatus comprising:
   a platform having first and second sides, a concave front edge, and a top surface for supporting the computer;
   first and second rigid supporting members each having first and second ends, the first ends of the supporting members being pivotally connected to the platform, wherein the first end of the first supporting member is connected to the first side of the platform and the first end of the second supporting member is connected to the second side of the platform;
   a supporting member stop, wherein the stop precludes one of the supporting members from rotating when the one of the supporting members is extended at an angle of less than 90° with respect to an axis the top surface substantially parallel to the first and second sides;
   a carrying strap connected between the second ends of the supporting members; and
   a cover for enclosing the computer when the computer is supported by the platform.

21. The carrying apparatus of claim 20, further comprising a wrist support member connected above and parallel to the front edge of the platform.

* * * * *